United States Patent [19]

Harris

[11] 4,272,466
[45] Jun. 9, 1981

[54] SYSTEM AND METHOD OF TEMPERATURE CONTROL FOR PLASTICS EXTRUDER

[75] Inventor: Holton E. Harris, Westport, Conn.

[73] Assignee: Harrel, Incorporated, East Norwalk, Conn.

[21] Appl. No.: 175,048

[22] Filed: Aug. 4, 1980

[51] Int. Cl.³ .............................................. B29F 1/00
[52] U.S. Cl. ................................... 264/40.6; 165/14; 165/27; 165/30; 366/79; 366/142; 366/145; 366/149; 425/144; 425/379 R
[58] Field of Search ........................ 264/40.6, 40.1; 425/143, 144, 379 R; 165/14, 27, 30; 366/142, 79, 145, 149

[56] References Cited

U.S. PATENT DOCUMENTS

| | | | |
|---|---|---|---|
| 3,698,844 | 10/1972 | Grimm | 425/144 |
| 3,733,059 | 5/1973 | Pettit | 425/144 |
| 3,751,014 | 8/1973 | Waterloo | 425/144 |
| 3,822,867 | 7/1974 | Evans | 366/79 |
| 3,866,669 | 2/1975 | Gardiner | 425/144 |
| 4,197,070 | 4/1980 | Koschmann | 425/143 |

*Primary Examiner*—Jeffery R. Thurlow
*Attorney, Agent, or Firm*—Brumbaugh, Graves, Donohue & Raymond

[57] ABSTRACT

A system and method of temperature control for a plastics extruder uses a deep well sensor and a shallow well sensor in each temperature control zone along an extruder barrel. The temperature indications of these sensors are not combined. The shallow sensor detects temperature near the barrel surface. An associated controller compares the sensor temperature with a manually preset temperature set point. The differences between the detected and set temperature are used by the controller to effect heating or cooling of its associated temperature control zone. Each deep sensor is located proximate the bore in which the plastic is moved. The deep sensor temperature indication is compared with the set point of a second controller. Variations of the deep temperature from the set point generate an error signal that is applied to the first, shallow well temperature controller to vary its set point. A melt temperature control addition can be made by adding a melt temperature sensor directly in the path of melt between the extruder screw and the extrusion die. A further controller compares its set point with that of the melt temperature and modifies the deep temperature controller set points of the several zones along the extruder barrel to correct the melt temperature.

15 Claims, 3 Drawing Figures

SYSTEM AND METHOD OF TEMPERATURE CONTROL FOR PLASTICS EXTRUDER

BACKGROUND OF THE INVENTION

This invention relates to a system for the control of temperatures in the bore of a plastics extruder, and more particularly to a system that controls bore temperature on the basis of two temperature sensors in each of a series of temperature control zones, one sensor being located in a deep well proximate the bore, and the remaining sensor being located in a shallow well near the surface of the barrel of the extruder.

In plastics extrusion lines, plastic pellets are introduced into the bore within an extruder barrel from a hopper. A screw of varying pitch moves the pellets towards the remote end of the bore where an extrusion die forms the extrudate or melt into sheet, hollow tube, pipe, hose, rod, or other arbitrary shapes suitable for such items as, for example, window molding. Typically, four to six different temperature zones are arranged longitudinally along the extruder barrel from the input hopper to the extrusion die. The pellets are melted as they move in the bore. The screw pitch varies along its length in accordance with the function it serves, first moving the pellets as they melt, then mixing the plastic that has melted, and finally, forcing the plastic melt through the die.

Commonly, each of the four to six temperature zones is maintained at a different temperature, to accomplish different objectives. The zone nearest the hopper will merely convey the solid plastic, melting it as it goes along. The next zone might be a mixing zone, with very high pressure and shear, which mixes the plastic thoroughly. This zone will often have a very different temperature from the first zone, as will the temperature zones remaining before the plastic is forced through the die. Heat is supplied to each zone by a zone heater which characteristically is a large aluminum casting with a calrod element in it. These heaters clamp onto the outside of the barrel.

Considerable frictional heat is generated by the screw as it turns in the plastic. An extruder screw may be driven by a 150 to 800 Hp motor, and much or almost all of that energy may ultimately be turned into heat. At high production rates, the heat generated exceeds the amount necessary to heat the plastic to the melting point, melt it, and then raise the melt to the desired temperature. In this case, in order to hold the temperature to the desired point, the temperature controller must supply cooling, as well. This is done by controlling the flow of a coolant through channels in the clamped-on heaters. It will be understood that although the term "heaters" is used herein, these are really temperature altering means, in many cases providing cooling or heating, as required.

Obviously, the temperature which is of most interest is the temperature of the plastic in the barrel. However, this cannot be controlled directly. The next best thing to do is to control the temperature of the barrel, very near the plastic. The straightforward way to do this is to drill a hole down into the barrel as close to the plastic as is mechanically feasible, and then to put a temperature sensor into this deep well. Until 1967, though, this was not feasible. The time lag between a heater on the outside of the barrel and the sensor deep inside the barrel was too great. The controller that energized the heater in response to sensed temperature would go into oscillation.

To see why this happens, assume a time lag of six minutes, which is not atypical, from the moment an increment of heat is added at the heater on the outside of the barrel to the time that heat is sensed at the sensor deep in the well. If the momentary temperature at the sensor is too low, the controller will add more heat at the heater. But it will be six minutes before the sensor recognizes that heat has been added, and by the time that the sensor gets the message, far too much heat has been added. The temperature overshoots. The sensor, of course, detects the temperature overshoot, it signals the controller, and the controller and the heater slams full into cooling. Again it is six minutes before the first cooling effect is felt at the sensor, and again there has been too much cooling, another correction is attempted and so the system oscillates.

In 1967 a new system introduced the concept of automatic reset in extruder controllers. As described in the inventor's article entitled Fundamental Analysis of Extruder Temperature Control, Modern Plastics, August 1967, McGraw-Hill Inc., New York, N.Y., automatic reset introduced an averaging function into the control loop, the loop that included the sensor, the controller, and the heater. Instead of responding to the instantaneous temperature, the automatic reset controller responded to the average temperature over a period of time. In the above example, if the averaging, or reset time is larger than six minutes, the controller would not oscillate as described, but would remain steady at the value necessary to hold temperature at the set point.

In about 1973, a system was advertised that used two sensors, one in a shallow well, and the other in a deep well. This system, it was said, responded faster to external changes.

There is considerable temperature gradient between the inside and the outside of any extruder barrel. This gradient can be as much as 100° F. (56° C.). Moreover, this gradient will be directly dependent on the amount of heat flowing; that is, it will change. It is easy to see, then, that weighting equally a sensor in a shallow well and another in a deep well is the equivalent, as far as the steady state conditions are concerned, of a single sensor midway between them. If the midpoint is held at the set point temperature, which is the temperature set into the controller as the desired temperature, then the deep well temperature, that which is closest to the plastic in the bore, will vary from the desired or set point temperature. In other words, the system introduced in 1973, with a shallow and a deep sensor, did indeed respond faster, but it controlled the wrong temperature.

In one system of the kind just described, temperature indications of the two sensors, the shallow and deep sensors, are simply averaged, and it is this average that the controller uses to control the supply of heating and cooling. In another system of this kind, the temperature indication of the deep sensor is weighted more heavily than that of the shallow sensor, because of the deep sensor's proximity to the plastic in the bore. This second alternative recognizes that it is the deeper sensor that is more significant, but it does not solve the problem. The temperature that is used to control the heater is still the wrong temperature. Weighting the temperature indication of the deep sensor only locates the controlled temperature at a location closer to the deep sensor than to the shallow sensor.

To control the actual temperature of the melt at the extrusion die downstream of the screw, it is known to place a temperature sensor at this location and to use it to control the set points of the controllers that control the heaters in the upstream zones. This technique controls the very important melt temperature near the point of extrusion, but it does so only by modifying the temperatures at all of the temperature zones upstream. This does not provide for deep well temperature sensing in a single zone to correct the temperature there independently. If, for example, the temperature drops in a zone where mixing of the plastic occurs, and this temperature drop results in a lower melt temperature near the die, then adjusting upwardly all of the set points may raise the melt temperature near the die, but it does not correct the error where it occurs, and it is not certain to result in the correct temperature for mixing where the erroneous temperature occurred.

BRIEF SUMMARY OF THE INVENTION

In a system and method of extruder temperature control in accordance with this invention, a shallow and a deep sensor are used in each controlled heat zone, but the temperature indications from the two sensors are not combined, either by averaging the two or by weighting. Rather, the deep sensor temperature is given its full significance by using the deep sensor to vary the set point of a controller that is connected between the shallow sensor and the heater.

The shallow well sensor is connected with a proportional plus automatic reset controller that controls the heater in the normal fashion. The indication from the sensor in the deep well goes to a second proportional plus automatic reset controller, and it is the temperature indication of this controller that controls the set point of the first controller. The "cascade system" thus constructed has an outside or shallow well loop that is extremely fast, responding very rapidly to changes in ambient temperature, coolant water temperature, etc. The deep well loop will continue to compensate for changes in plastic temperature. The correct temperature is measured, that near the bore, and the full effect of temperature variations in the deep well is reflected in the set point alterations that result.

The deep well sensor and controller can accommodate changes in plastic temperature resulting from changes in plastic composition or variations in screw speed, or the like. Because these changes take longer to occur, the slower deep well system is adequate to handle them.

In summary, then, by responding to changes in external conditions just as fast as any two-sensor system, and by holding the deep well temperature, not at a midway point but at the correct set point, the system is fast and it controls the right temperature.

If desired, the shallow well controller can be a proportional controller, without automatic reset. In the past, automatic reset has been employed to integrate out the gradual drift away from the desired temperature known as "droop". This was done by adding a correction factor dependent upon the integral of measured temperature error with time. In the system according to the invention, the control provided by the deep well loop serves to integrate out any "droop". Little loss in performance is, therefore, observed by the elimination of automatic reset in the shallow well loop. Since temperature changes there occur rapidly, and can be corrected rapidly, the loss of the automatic reset correction factor that is based on the integral of the temperature error with respect to time has little significance.

Proportional control may be accomplished by varying the magnitude of the energizing current to the heaters in a manner proportional to the magnitude of the temperature error detected. It may also be accomplished by having the heater either full on or full off at all times, but varying the percentage of on time in a manner proportional to the magnitude of the temperature error detected. This latter system is called time proportioning. In zones with combined heating and cooling, a solenoid valve is used to control a flow of water or other coolant through the heater. These solenoid valves are also controlled by a time proportioning signal—that is, the solenoid valves are either full open or full closed, and the percentage of time open is varied in a manner proportional to the temperature error. "Proportional", then, as used herein, means either manner of making the temperature correction vary with the detected temperature error.

Although the deep well sensor controller can be a simple proportional controller, without automatic reset, there is a substantial loss in performance. Not all of the "droop" is integrated out inasmuch as the deep well loop will not be responsive to the integral of error, just to its magnitude.

The systems and methods of this invention can be accomplished by the use of conventional "discrete" controllers, two for each temperature control zone. On the other hand, currently available multiple zone microprocessor controllers can digitally respond to both the shallow and deep well sensor to provide proportional control, with or without automatic reset. On the basis of temperature detected by the shallow well sensor, digitally represented, a microprocessor can compare a stored set point and generate an output control signal for correction. Likewise, the digitally represented temperature indication of a deep well sensor can be compared to a stored set point, and the difference can be used to alter the first set point, that to which the first sensor temperature indication is compared.

In a further embodiment of the invention, detection of the melt temperature downstream of the screw, proximate the die, is used, in addition, to vary the deep well set points of the zones upstream. The melt sensor is placed in the melt just before the extrusion die. Hence, the final, ultimately important temperature, that of the melt, can still be sensed and can be used to vary the deep well loop set points for each preceding zone, in the event that the improved zone-by-zone control of this invention does not succeed in producing the desired melt temperature. The set point variations caused by melt temperature error can be weighted in accordance with the desired temperature profile from zone to zone along the bore.

The above and further advantages of the invention will be better understood with respect to the following detailed description of preferred embodiment, taken in combination with the several figures of the associated drawings.

DETAILED DESCRIPTION OF PREFERRED EMBODIMENTS

Figure 1:
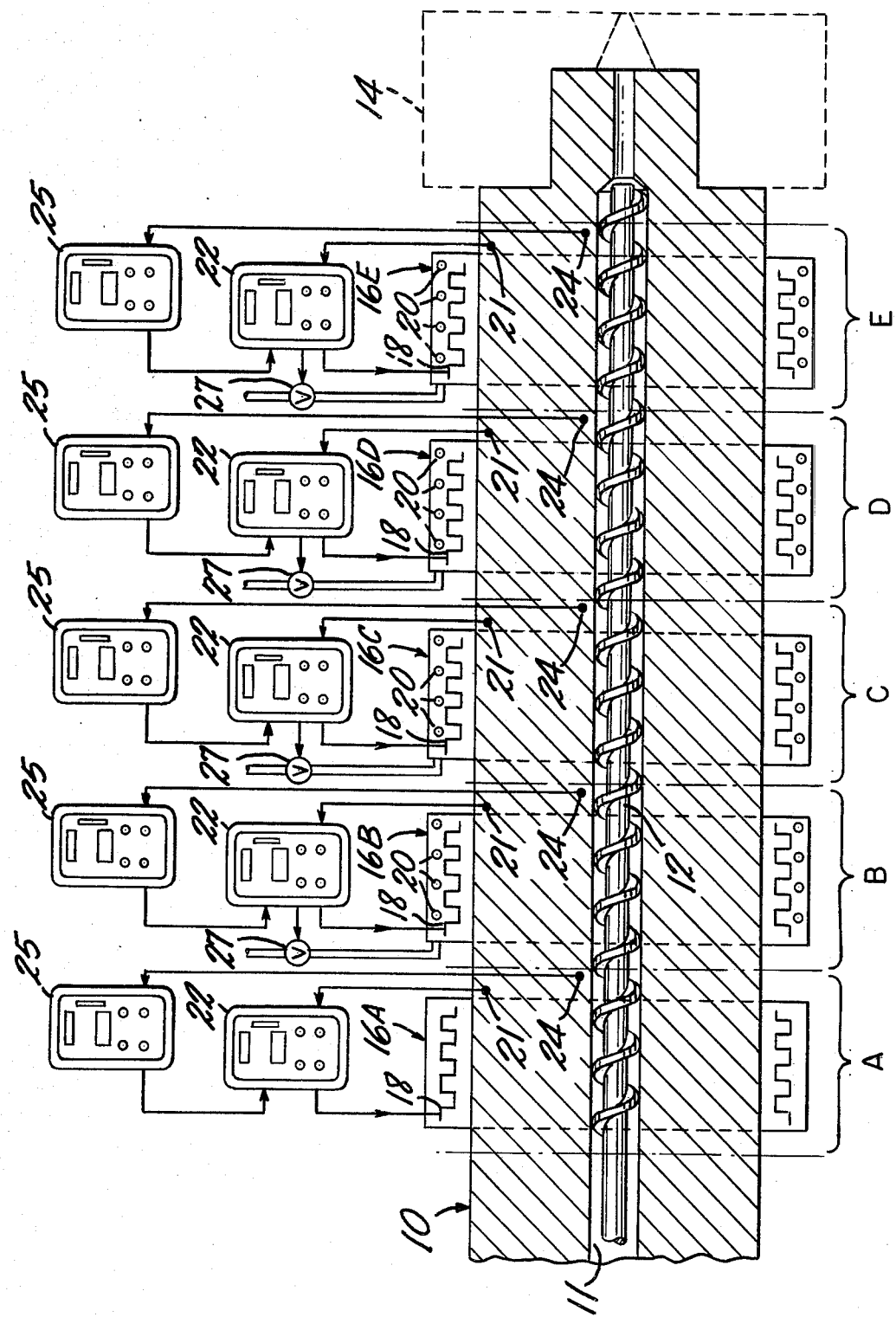
FIG. 1 is a schematic illustration, in block diagram form, of a temperature control for a plastics extruder, and shows five sets of cascaded deep and shallow sensors, each with a controller.

In FIG. 1, an extruder barrel 10 defines a bore 11 in which a screw 12 moves plastic to the right from a location to the left of the figure, where an input hopper (not shown) characteristically introduces pellets of solid plastic. The pellets are conveyed down the bore 11 and melted. The plastic is mixed by the screw 12, and extruded at a die 14. Heaters 16A–16E define five distinct temperature control zones A–E along the extruder barrel 10. In accordance with known practice, the heater can be equipped only with heat introducing elements 18 such as calrods, or the heaters can be, in effect, temperature altering means that are equipped with cooling coils 20 as well. In FIG. 1, the heater 16A of temperature control zone A is shown, for purposes of illustration, as being of the heat only type, while the heaters 16B-E associated with the zones B-E are equipped for heating or cooling.

In each of the temperature zones A-E, a shallow well sensor 21 detects the temperature of the barrel 10 near its outer surface. These sensors can be resistance temperature detectors (RTDs) or thermocouples, producing an analog electrical representation of the sensed temperature. Each shallow well sensor is connected with a controller 22 that can be a commercially available proportional controller, with or without automatic reset.

A similar series of deep well sensors 24 in the barrel 10, proximate the bore 11, in the zones A-E, detects the temperature deep within the barrel near the path of plastic moving down the bore. A second series of controllers 25, preferably proportional with automatic reset, receive the analog temperature indications of the sensors 24. The controllers 22 and 25 may be commercially available controllers such as the individual heat zone controllers ordinarily associated with each heat zone in, for example, a Harrel MC-201-DD variable profile melt system. These have manually adjustable set points with respect to which sensor temperature indications are compared.

As shown, outputs of the controllers 22 control the energization of the heating elements 18 of the heaters 16A–16E in all zones. A temperature indication from a shallow well below the set point $T_1$ of the controller 22 by a prescribed amount will result in heater energization by the controller. As illustrated in zones B through E, each controller 22 can activate a solenoid control valve 27 to cause coolant flow in the cooling coils 20 when temperature sensed by a shallow well sensor 21 rises a prescribed amount above the chosen set point of a controller 22.

Controllers 25 respond to the temperature sensed by the deep well sensors 24. The outputs of the controllers 25 vary the set points of the controllers 22. If the deep well sensor 24 detects a temperature a prescribed amount above the set point $T_2$ of its associated controller 25, then that controller applies an output signal to the controller 22 in its zone to reduce the set point $T_1$ of the controller 22 accordingly. The reverse occurs for a deep well temperature that is too low.

The set point modification that the deep sensor loop, that is, the sensor 24 and its controller 25, provides will be a function of the temperature gradient from the outside surface of the barrel 10 to the bore 11. This temperature gradient ordinarily is 40° to 100° F. (22° to 56° C.). If, then, the controller 22 set point is initially set at the desired plastic temperature in its associated zone, and a 75° F. gradient exists between the sensor 21 and the sensor 24, the controller 25 will automatically increase the set point of the controller 22 by 75° to increase the heat flow from the heater 16 to the deep sensor 24 until the deep sensor 24 senses a temperature within a predetermined range of the set point manually set at its associated controller 25 at which no further heating is called for. Likewise, in those zones B-E that provide for cooling, if the energy supplied to the screw 12 and converted to heat raises the temperature at a deep sensor 24 above the set point temperature of its controller 22, the reduced temperature gradient, i.e., the smaller difference between the temperatures at the sensors 22 and 24 results in reduction of the set point of the controller 22 to cause cooling.

Ambient temperature variations affecting the temperature of the barrel at its outer surface will be immediately sensed by the shallow sensors 21 and the amount of heat being applied to the barrel will be modified accordingly. This occurs rapidly. If, at the same time, an increase in screw speed, or a change in plastic consistency affects the temperature in the bore, the deep sensor will detect this, and its controller 25 will make appropriate set point modifications in the controller 22. These two independent considerations, shallow well temperature and deep well temperature, are treated independently and given their full significance, rather than in an averaging or weighting system wherein only a compromise modification of the amount of heating or cooling is made.

Figure 2:
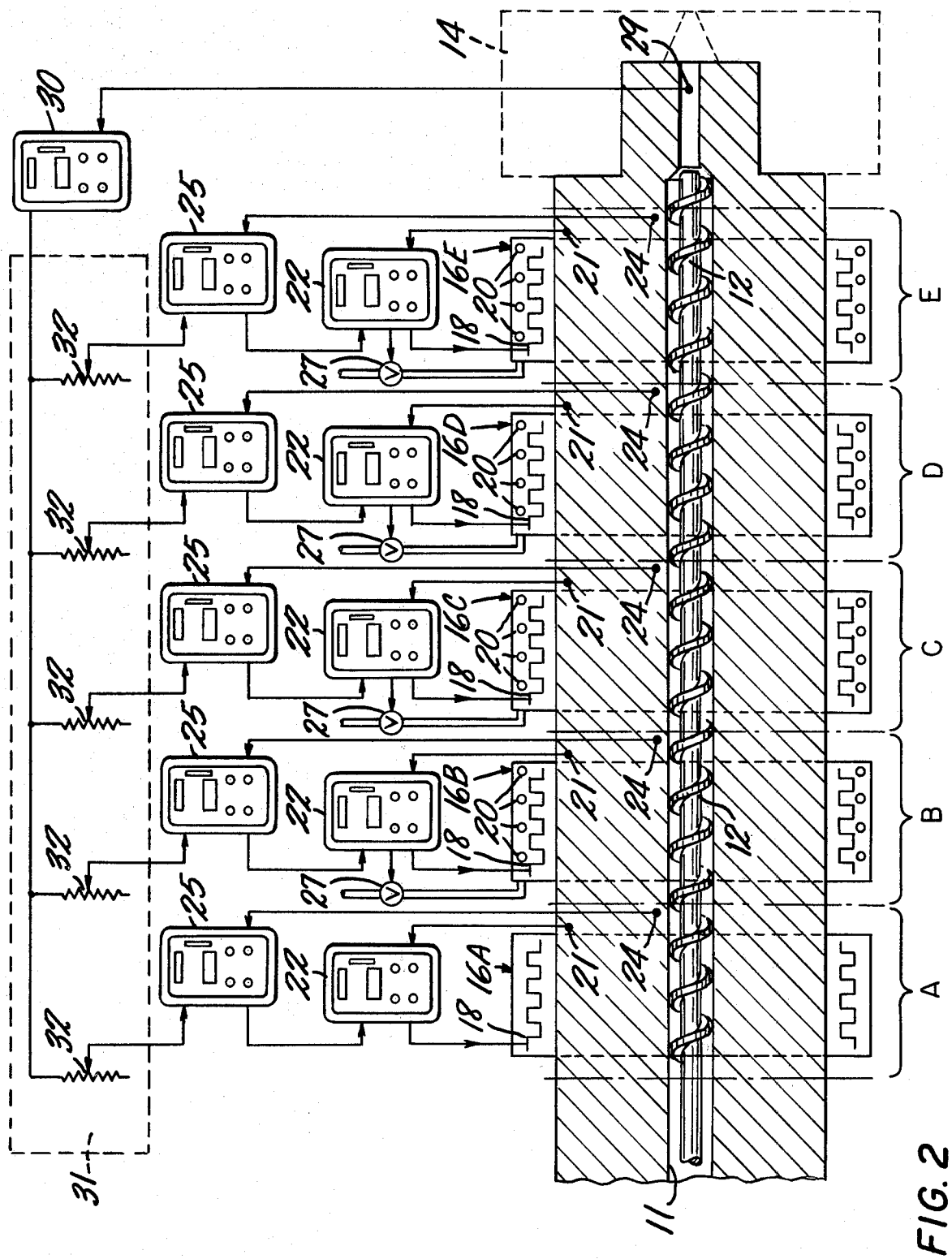
FIG. 2 is a further schematic illustration, in block diagram form, and shows the addition to the system of FIG. 1 of a melt temperature sensor and controller for modifying set points of the deep well sensors.

The embodiment of FIG. 2 adds one more tier of cascade control to a system like that illustrated and described in connection with FIG. 1. In FIG. 2 like numerals designate like elements. A melt temperature sensor 29 is actually located in the flow of melt downstream of the extruder screw 12. The actual temperature of the melt just prior to the extrusion die 14 is thus sensed. A controller 30 receives the temperature indication of the sensor 29 and compares it with a set point $T_3$ of that controller. The controller 30 controls, in turn, the set points of the deep well controllers 25. As illustrated by the current divider network 31 with manually adjustable resistances 32, the melt temperature responsive controller 30 can vary the set points of the deep well sensors 25 independently, with varying degrees of modification from one zone to the next. Thus, the deep well temperature modification of the shallow well set point zone by zone is compatible with the previously known melt temperature set point modification technique. For the embodiment of FIG. 2, the controller 30 can be a commercially available controller such as the melt temperature controller of the Harrel Mc-201-DD variable profile melt system, used to vary set points of single loop barrel temperature controllers.

Figure 3:
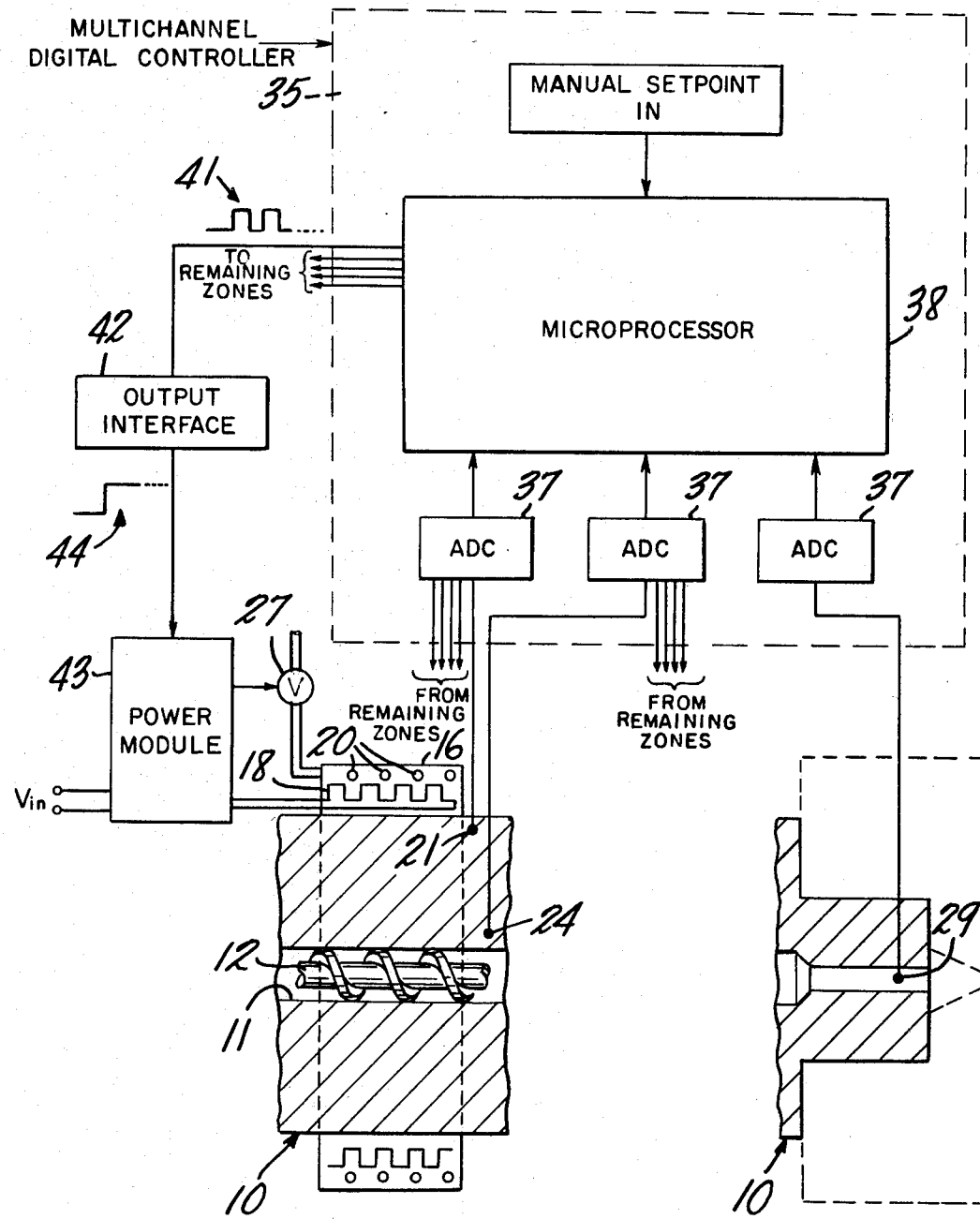
FIG. 3 is a schematic illustration, again in block diagram form, of a multichannel digital controller using microprocessing to effect the method of temperature control provided by the system illustrated in FIG. 2.

A third embodiment is illustrated in FIG. 3. Here, a multichannel digital controller 35, now being commonly used for temperature control of extrusion lines, makes each of the comparisons of the detected temperatures with the controller set points and modifies set points exactly as described hereinabove. Again, like numerals designate like elements.

The digital controller 35 is illustrated in FIG. 3 for simplicity of illustration in relation to just one heat zone of the extruder barrel 10. Analog temperature indications of a shallow well sensor 21, a deep well sensor 24, and a melt temperature sensor 29 are converted to digital representations at one or more analog to digital convertors 37 and supplied to a microprocessor 38. Set points corresponding to the set points of the shallow well controllers 22, the deep well controllers 25, and the melt temperature controller 30 in FIG. 2 are stored in the microprocessor memory. Each set point is compared with its associated sensor temperature indication from, respectively, the shallow well sensor 21, the deep well sensor 24, and the melt temperature sensor 29. Ambient temperature variations detected by the shallow well sensor 21 that cause the digitized temperature indication from that sensor to vary from the associated, stored shallow set point results in a microprocessor output signal 41. To produce a time proportioned output 44 varying in percentage of time on, with the difference between sensed temperature and set point, a known output interface circuit 42 is called for. This circuit's output is directed to a power module 43, which is a commercially available module, which can provide solid state relays for the energization of the heating element 18 of that zone or the solenoid activated valve 27 that controls coolant flow.

Likewise, the digitized temperature indication of the deep well sensor 24 is compared with a stored deep well set point. This corresponds to the set point of the controllers 25 in the foregoing embodiments. Any temperature error detected in this comparison modifies the set point with which the digitized temperature indication of the shallow sensor 21 is compared. Each of these comparisons is carried on for each zone of an extrusion barrel. In addition, microprocessing permits the centralized handling of signals from numerous barrels of numerous extruders in a large plant.

Again, as described in connection with FIG. 2, the temperature indication from the melt temperature sensor 29 is, after digitization, compared with a stored melt set point. Variations of the melt temperature from that sought alter the deep well set points against which deep well temperatures are compared for the various temperature control zones. The degree of deep well set point variation, zone to zone, can vary as desired, to maintain a preselected heat profile longitudinally of the barrel.

A commercially available multichannel digital controller suitable for use in the embodiment of FIG. 3 is the Harrel CP-640 or CP-641 microprocessor controller. The output interface circuit 42, shown separately for clarity actually would ordinarily be a microprocessor circuit, for example an individual card CA-300KA. The power module 43 can be a known solid state switching device compatible with the controller output and capable of switching current to the heater element and to the control valve if cooling is provided. For example, the Harrel PM series modules are compatible with the output of the above-mentioned CP-641 16 channel temperature controller.

The improvement that each of the three embodiments of FIGS. 1, 2 and 3 according to this invention provides can be further understood by consideration of the equation for heat flow in a conducting medium, such as the barrel 10.

$$Q = KA/t\Delta T \tag{1}$$

Where:
K = a constant of the material;
A = cross sectional area of the heat flow path;
t = length of the heat path; and
$\Delta T$ = difference in temperatures between the two ends of the heat path.

From the equation (1), it can be seen that if additional heat is needed to maintain the plastic temperature at a desired set point, the only way to supply this heat is to create a $\Delta T$ between the outside and the inside of the barrel by supplying heat to the heater. This heat will raise the temperature of the outer part of the barrel, increasing $\Delta T$, and causing heat to flow from the outside to the inside of the barrel.

Should ambient temperature suddenly decrease, the system would lose more heat to the surrounding air than previously, and the outer portion of the barrel would cool down, reducing $\Delta T$ and thus reducing the heat flowing inwardly to the bore. Remembering that there is a significant time lag, in the order of six minutes typically, in the flow of heat to the bore, this means that there would be a significant time lag before the deep sensor temperature changed, if only a deep sensor were present. Six minutes would therefore elapse before the controller started to make the correction. It would be even longer before the outer portion heated up again sufficiently, and the system became stable again. The problem here is that the deep sensing controller only signals the need for heat, and only causes the heater to supply additional heat to the outer portion of the barrel. If part of that heat is diverted, by the ambient temperature change for example, the $\Delta T$ will be adversely affected, and the deep well sensor will not detect this failure to supply adequate heat for another period of time.

By contrast, the cascade system according to this invention is very fast acting. The deep controller is controlling not the heat, but the temperature of the outer portion of the barrel by revising the set point of the shallow well sensor's controller. If part of the heat is diverted so that the outer barrel cools down, the very fast shallow sensor will act to correct this immediately. The deep sensor will hardly know anything happened, because the $\Delta T$ remains the same, the heat flow to the plastic and the temperature will stay constant.

A system that averages or weights a shallow and a deep sensor output, on the other hand, only partially corrects for shallow temperature changes. By virtue of combining the shallow and deep temperature indications, neither is given its full significance. In these earlier systems, no attempt was made therein to maintain $\Delta T$ at its correct value to provide the necessary heat flow.

Thus, it will be seen, an improved temperature control system and method of temperature control is provided. The above-described preferred embodiments of the invention are exemplary only. The spirit and scope of the invention should not be understood to be limited by these. Rather, the scope of the invention is set forth in the appended claims.

I claim:

1. An improvement in a temperature control system for a plastics extruder, the extruder having a barrel defining a bore for the movement of plastic therein, at least one temperature control zone served by a temperature altering means including a heater, the temperature altering means being coupled to the barrel to provide heat to the plastic in the bore in the zone, the temperature control system being of the kind that includes a shallow well temperature sensor located in a shallow well near the outer surface of the barrel and in the temperature control zone at a location that is subject to temperature alteration by the temperature altering means, a second temperature sensor located in a deep well in the barrel proximate the bore and in the temperature control zone at a location that is subject to temperature alteration by the temperature altering means; the improvement comprising:

(a) means connected with the shallow well sensor for comparing the temperature indication of the shallow well sensor with a preset temperature setpoint $T_1$, (b) means, connected with the means for comparing and with the temperature altering means, for activating the temperature altering means based on the difference between the sensed shallow well temperature indication and $T_1$, (c) means connected with the deep well sensor for comparing the temperature indication of the deep well sensor with a further preset temperature set point $T_2$, and (d) means responsive to the comparison by said means connected with the deep well sensor for altering the first-mentioned preset temperature set point $T_1$ based on the difference between the sensed deep well temperature indication and $T_2$.

2. The improvement in extruder temperature control systems according to claim 1, wherein said means connected with the shallow well sensor for comparing temperature indications comprises control means free of automatic reset for producing an output having a characteristic that varies with the magnitude of the difference between the sensed and present temperature set point $T_1$.

3. The improvement in temperature control systems according to claim 1, wherein the temperature altering means includes both means for heating and means for cooling the extruder barrel in the zone, said means for activating providing outputs to both the heating and cooling means to provide control thereof.

4. The improvement in extruder temperature control systems according to claim 1, wherein both of the means for comparing are discrete controllers having outputs with characteristics that vary with the difference between their present temperature set points and the temperature indications applied thereto by the sensors.

5. The improvement in temperature control systems according to claim 1 wherein both of said means for comparing comprise stored preset temperature set points $T_1$ and $T_2$ in a microprocessor output indicative of differences between sensed shallow well temperature indication and $T_1$, and means for revising the stored $T_1$ based on the comparison of deep well temperature sensor indication and $T_2$.

6. The improvement in extruder temperature control systems according to claim 1 further comprising a melt temperature sensor located in the path of movement of plastic melt upstream of an extrusion die, means connected with the melt temperature sensor for comparing the temperature indication of the melt temperature sensor with a third preset temperature set point $T_3$, and means responsive to the comparison by said means connected with the melt temperature sensor for altering the preset temperature set point $T_2$ that is compared with the deep well sensor indication.

7. The improvement in extruder temperature control systems according to claim 6, further comprising a melt temperature sensor located in the path of movement of plastic melt temperature sensor for comparing the temperature indication of the melt temperature sensor with a third preset temperature set point $T_3$, and means responsive to the comparison by said means connected with the melt temperature sensor for altering the preset temperature set point $T_2$ that is compared with the deep well sensor indication, and wherein said means for comparing, which is connected with the melt temperature sensor, comprises a stored preset temperature set point $T_3$ in the microprocessor memory, and means for revising the stored temperature set point $T_2$ based on a comparison of the melt temperature set point of the melt temperature sensor and $T_3$.

8. The improvement in extruder temperature control systems according to claim 1 wherein further plural multiple temperature control zones occur along the barrel, and each further zone has a further one of said altering means serving that zone, shallow well sensor, deep well sensor, means connected with the shallow well sensor for comparing with its own preset temperature set point $T_1$, means for activating the temperature altering means based on the difference between sensed shallow well temperature indication and the respective $T_1$, means connected with the deep well sensor for comparing with its own preset temperature set point $T_2$, and means for altering the particular $T_1$ based on the difference between sensed deep well temperature indication and $T_2$.

9. The improvement in extruder temperature control systems according to claim 8, wherein each means for comparing includes means for varying the particular preset temperature set point $T_1$ and $T_2$ thereof.

10. The improvement in temperature control systems according to claim 9 further comprising a melt temperature sensor located in the path of movement of plastic melt upstream of an extrusion die, means connected with the melt temperature sensor for comparing the temperature indication of the melt temperature sensor with a third preset temperature set point $T_3$, and means responsive to the comparison by said means connected with the melt temperature sensor for altering a plurality of the preset temperature set points $T_2$ that are compared with deep well sensor indications.

11. The improvement in extruder temperature control systems according to claim 8, 9, or 10 wherein each means for comparing comprises stored preset temperature set points in a microprocessor memory, and further comprising microprocessor outputs indicative of differences between sensed shallow well temperature indications and $T_1$ in each zone, and means for revising the stored $T_1$ based on the comparison of deep well temperature sensor indication and $T_2$ in each zone.

12. A method of temperature control for a plastics extruder that has a barrel defining a bore for the movement of plastic therein, a temperature control zone served by a temperature altering means including a heater, the temperature altering means being coupled to the barrel to provide heat to the plastic in the bore in the zone; the temperature control method including:

(a) sensing temperature in a shallow well near the outer surface of the barrel in the temperature control zone at a location that is subject to temperature alteration by the temperature altering means, (b) sensing temperature in a deep well in the barrel proximate the bore and in the temperature control zone at a location that is subject to temperature alteration by the temperature altering means, (c) comparing the shallow well temperature with a preset temperature $T_1$, (d) activating the temperature altering means based on the difference between the sensed shallow well temperature and $T_1$, (e) comparing the deep well temperature with a further preset temperature $T_2$, and (f) altering the first-mentioned preset indication $T_1$ based on the difference between the sensed deep well temperature and $T_2$.

13. The method of extruder temperature control according to claim 12 for control of an extruder having plural temperature zones each served by a temperature altering means; the method further comprising sensing temperature in a shallow well near the outer surface of the barrel in each of the temperature control zones, sensing temperature in a deep well in the barrel proximate the bore in each zone, comparing each shallow well temperature with a preset temperature $T_1$ for each zone, activating the temperature altering means in each zone based on the difference between the sensed shallow well temperature and a particular $T_1$ for that zone, comparing each deep well temperature with a preset temperature $T_2$ for each zone, and altering the first-mentioned preset temperature in each zone $T_1$ based on the difference between the deep well temperature in that zone and a particular $T_2$ for that zone.

14. The method of extruder temperature control according to claim 12 or 13, further compising the steps of sensing the temperature of plastic melt in the path of plastic movement upstream of an extrusion die, comparing the melt temperature with a third preset temperature $T_3$, and altering the preset temperature $T_2$ based on the difference between the melt temperature and $T_3$ to vary the resultant variations effected in $T_1$ and the temperature alterations by the temperature altering means to adjust the melt temperature.

15. The method of extruder temperature control according to claim 13 wherein at least one temperature altering means includes means for cooling the barrel in a temperature control zone; the step of activating the temperature altering means includes heating the barrel in a temperature control zone when the sensed shallow well temperature is less than $T_1$ in that particular zone and cooling the barrel in the particular zone when the sensed shallow well temperature exceeds $T_1$ in that zone.

* * * * *